United States Patent Office 3,081,969
Patented Mar. 19, 1963

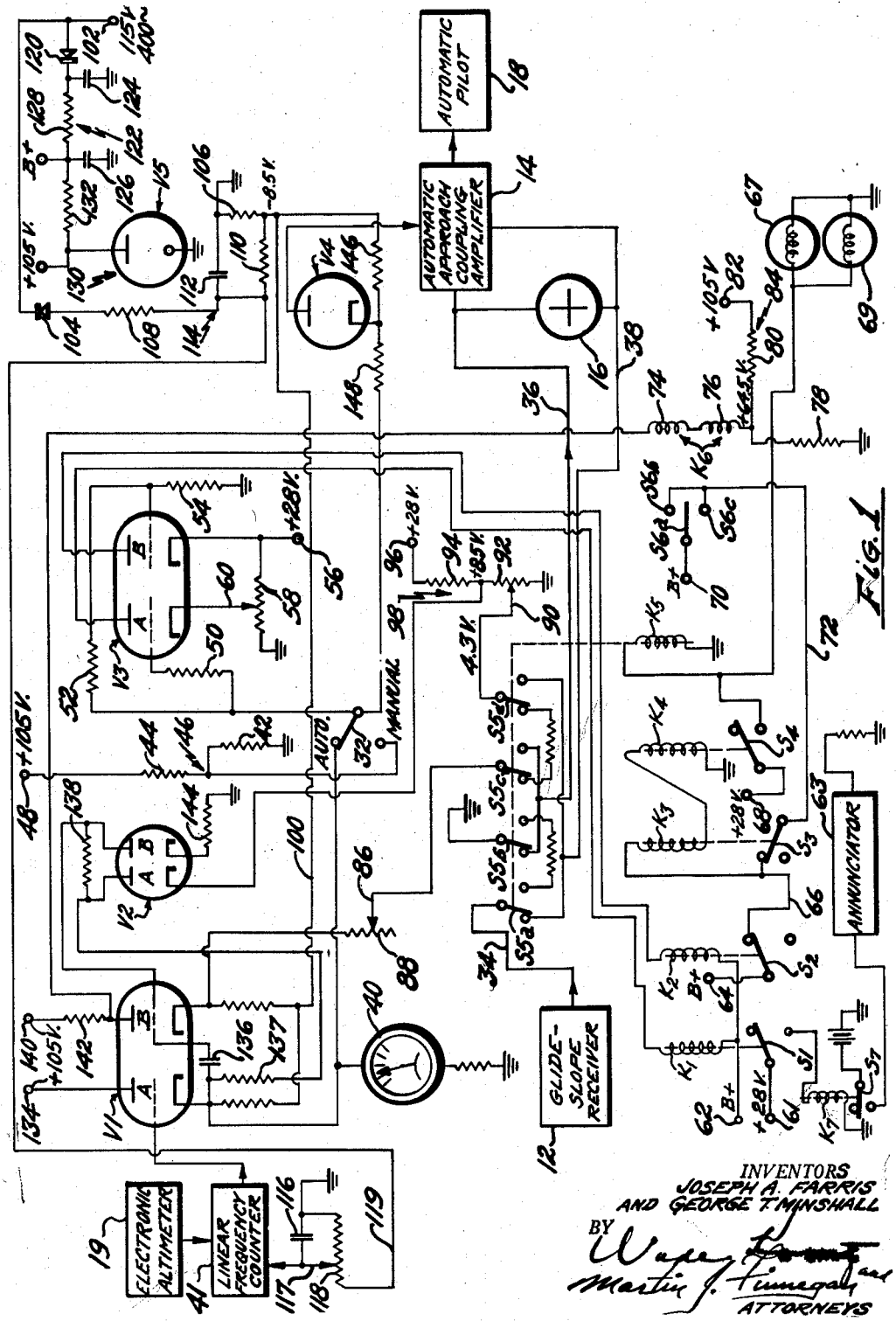

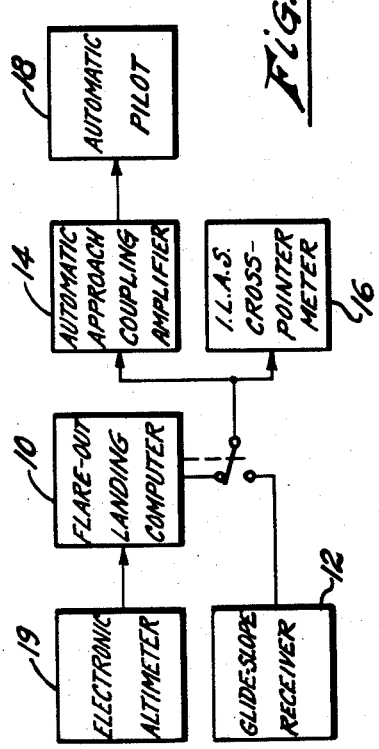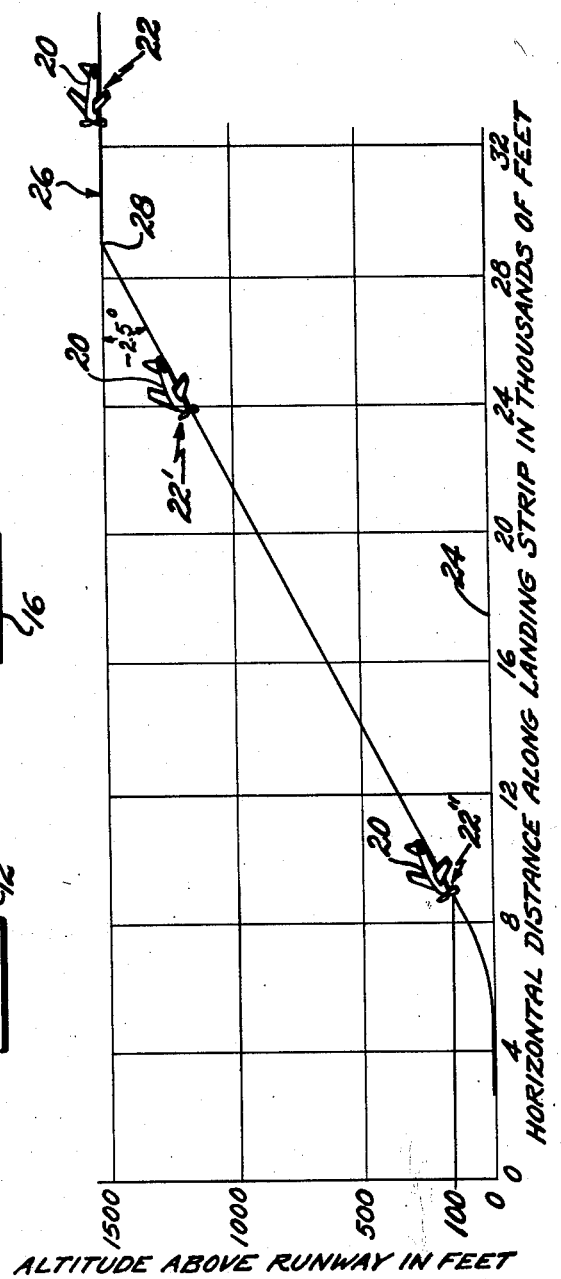

3,081,969
AIRCRAFT FLARE-OUT LANDING SYSTEM
Joseph A. Farris, Xenia, and George T. Minshall, Yellow Springs, Ohio, assignors to the United States of America as represented by the Secretary of the Air Force
Filed Apr. 1, 1958, Ser. No. 725,765
6 Claims. (Cl. 244—77)
(Granted under Title 35, U.S. Code (1952), sec. 266)

The invention described herein may be manufactured and used by or for the United States Government for governmental purposes without payment to us of any royalty thereon.

The present invention relates to a system for guided aircraft landings, and more particularly, to an electronic computer that enables manual or automatic flare-out landings to be made once an aircraft has descended below a predetermined altitude.

In the various types of presently used landing approach systems, as the aircraft approaches an instrument low approach system (ILAS) station or other transmitting station, difficulty is experienced due to the increasingly critcial sharpness in the response of the indicator to vertical deviations from preselected guidance signals, as the distance between the aircraft and the station decreases to a small value. That is, during an aircraft instrument landing, increased sensitivity of the indicator is particularly undesirable because the landing signal path is extremely difficult to follow during the last few seconds just prior to touchdown of the aircraft. During this interval of time, the landing signal path indicator may swing erratically from an extreme indication for flight-upward correction to an extreme indication for flight-downward correction.

It is desirable, in an instrument landing system, to have a degree of sensitivity sufficient to indicate accurately the deviations of an aircraft from the signal path to allow the pilot to determine his distance from the desired path and to alter his course accordingly. Similarly, in automatic flight control, an ideal system should include circuitry of such sensitivity that the magnitude of course deviation may be automatically monitored and corrected to achieve a landing in accordance with a desired landing flight path.

It is an object of the present invention to generate flare-out signals to energize an automatic pilot to effectuate a smooth, automatic landing of an aircraft from an inclined flight path on which the aircraft may be descending.

It is an object of the present invention to generate flare-out signals to continuously energize a conventional cross-pointer meter, usually employed with an automatic pilot to apprise the pilot of the position of the aircraft during automatic control of the landing and when control of the landing is preferably assumed by the pilot.

It is an object of the present invention to provide signals to compensate for any deviation of the aircraft from a preferred flare-out landing path.

It is an object of the present invention to generate pitch-reference signals for application to an automatic pilot to cancel the setting of aircraft control mechanisms originally positioned by the control exerted over the automatic pilot by a conventional glide-slope receiver.

It is an object of the present invention to sense the rate of descent of the aircraft and to provide signals to compensate for deviations from a preferred rate.

It is an object of the present invention to provide signals to compensate for any sudden ascent of the aircraft near touchdown more rapidly than for any sudden descent near touchdown.

The computer system of the present invention is adapted to operate with other conventional airborne electronic equipment energized by and responsive to ground-generated flight path signals for guiding an aircraft to a landing. Accordingly, the pilot may execute a smooth landing by entrusting the landing to the automatic control of the computer system of the present invention or he may employ automatic-pilot control for a portion of the landing and manually assume control of the final phases himself.

When computer control is employed, at a predetermined altitude a circuit responsive to the altitude of the aircraft above the landing strip energizes a device that removes control of the automatic pilot from a glide-slope receiver that may be employed for energization thereof to have the aircraft descend along a predetermined flight path, and transfers control to computer circuitry. Another circuit responsive to the altitude responsive circuit provides flare-out error signals which are indicative of any deviation of the rate of descent of the aircraft from a preferred rate and which are also corrective of any altitude deviation of the aircraft from a predetermined and selectable flare-out path. Provision is also made for recomputing the flare-out path rapidly in the event that the aircraft is suddenly forced to ascend near touchdown. Additionally, pitch-reference signals are provided at a predetermined altitude for readjusting the setting of the aircraft actuating mechanisms originally actuated when the glide-slope receiver output controlled the descent of the aircraft.

These and other features and objects of the present invention will be understood by the following description taken in conjunction with the accompanying drawings, wherein:

FIG. 1 is a schematic diagram of a computer and its relation to other airborne equipment comprising the computer system;

FIG. 2 is a block diagram of the computer system in its relation to other airborne equipment; and FIG. 3 is a diagram depicting the landing path followed by an aircraft.

A system depicting a flare-out computer 10 and other airborne components with which the computer operates for controlling the landing of an aircraft is shown in FIG. 2. A conventional glide-slope receiver 12 may be employed to furnish signals, having magnitude and direction, to a conventional automatic approach coupling amplifier 14 and an ILAS cross-pointer meter 16 usually employed with an angular displacement-type automatic pilot 18. These signals may be employed to have the automatic pilot guide the descent of the aircraft down a predetermined flight path to within a reasonable altitude from the landing strip, at which altitude the pilot may assume control and execute a smooth landing. Alternatively, the pilot may govern the landing entirely and merely observe his position by consulting the improved stabilized indications of the cross-pointer meter which is energized by the output of the computer 10.

In accordance with the present invention, the aforementioned controls over the landing are avaibale, but when the computer 10 is energized and the output of an electronic altimeter 19 applied thereto, at a predetermined altitude the computer energizes a switching device which removes the output of the glide-slope receiver from the automatic pilot and furnishes flare-out signals thereto. Below a predetermined altitude, the output of the computer energizes the automatic pilot until touchdown, unless the rate of descent of the aircraft or the altitude of the aircraft deviates sufficiently from preferred standards so as to cause the computer to relinquish control.

As shown in FIG. 3, an aircraft 20 at position 22 is approaching a landing strip 24 from the right at an altitude of 1500 feet. The approach of the aircraft is in accordance with a predetermined flight path 26. Such a flight path includes a glide-slope path for executing a smooth landing which may be produced by any suitable techniques known to persons skilled in the prior art, as for example, by overlapping a glide-path beam and a localizer beam at different frequencies and at different angular displacement to one another so that points laterally equidistant between the periphery of the overlapping area of the two beams defines a desired glide-slope angle, for example, —2.5 degrees. The angle shown in FIG. 3 is exaggerated for purposes of illustration.

As the aircraft reaches a predetermined position 28 in the flight path 26, an airborne glide-slope receiver 12 begins to receive generated glide-slope signals. During normal operation, the output of the receiver is preferably coupled to a cross-pointer meter 16 and to the automatic approach coupling amplifier 14 by placing selector switch 32 (FIG. 1) in Manual position until certain other prerequisites for utilizing the output of the computer are met. Referring now to FIG. 1, lead 34 couples the output of the receiver 12 to the contact S5a of a relay K5. Leads 36 and 38, connected across the contacts S5a and S5b, couple the output of the receiver 12 to the meter 16 and to the amplifier 14. The output of the amplifier is coupled to the automatic pilot 18. By means of this arrangement, the output of the glide-slope receiver is coupled to the automatic pilot 18 and the pilot may use the meter 16 in a customary manner to monitor the path of the aircraft as it descends on the flight path.

The relay K5 is de-energized when the selector switch 32 is in Manual position by the operation of tube V3B and relays K2 and K4. Approximately 50 volts developed across a resistor 42, which together with a resistor 44 form a voltage divider 46 between a 105 volt D.-C. source 48 and ground, is applied to the grids of tubes V3A and V3B through resistors 50 and 52, respectively. The grid of tube V3B is returned to ground through resistor 54. The cathode of the tube V3B is connected to a 28-volt source 56 and to a variable resistor 58 which functions as the load therefor. A movable tap 60 is connected to the cathode of the tube V3A and enables the bias of this tube to be adjusted. A B+ source 62 is applied to the solenoids of relays K1 and K2 which are connected to the anodes of tubes V3A and V3B, for applying voltages to said anodes. The tubes V3A and V3B are biased to saturation by this arrangement and sufficient current flows in the anodes thereof to keep relays K1 and K2 energized. In the energized position of relay K1, a source of 28-volts D.C. 61 may be applied to the solenoid of a relay K7 for energization thereof. In the unenergized position of relay K7, a contact S7 may be used to apply a voltage to an annunciator 63 to provide an aural indication of the switchover to flare-out operation. However, this feature is merely an adjunct to the present invention and a voltage corresponding to the period of switchover to flare-out operation may be available as aforementioned for energizing local or remote indicators as is well known to persons skilled in the art. In the energized position of relay K2, a B+ source 64 is applied to serially connected solenoids of relays K3 and K4 via a contact S2 and a lead 66. This voltage causes the relay K4 to become energized which in turn causes the relay K5 to become de-energized by the opening of a contact S4 connected between a 28-volt D.-C. source 68 and the solenoid of said relay K5 as shown. In the de-energized position of relay K5, the output of the receiver 12 controls the automatic pilot 18, as previously mentioned.

In conjunction with electronic altimeter 19, the system employs a height indicator 40. The height indicator 40 is connected to the cathode of a cathode follower V1A which functions to generate a D.-C. control voltage in response to the linear voltage output of a linear frequency counter 41. The height meter gives direct reading indicative of the instantaneous true height of the aircraft. In the Auto mode of operation, at some preselected altitude, dependent upon factors to be explained subsequently, the aircraft will approach the landing strip at a reduced angle or "flare-out path" by computer control over the input to the automatic pilot.

With switch 32 in the Auto position, the output of a cathode follower V1A is applied to the grids of tubes V3A and V3B, the grid of V3B having a smaller voltage applied thereto since it is returned to ground through the resistor 54. The input to the cathode follower V1A is a controlled voltage proportional to the altitude of the aircraft with a slope of 0.33 volt per foot terrain clearance altitude. The parameters of tube V3B, namely the magnitude of the voltage developed across variable resistor 58, the 28-volt bias applied to the cathode, and the magnitude of the signal applied to the grid, are selected so that when the aircraft is at approximately 100 feet above the landing strip, current flowing through the tube is decreased to the point that causes relay K2 to become de-energized. This point is indicated for purposes of explanation by position 22″ in FIG. 3. When relay K2 is de-energized, contact S2 opens and removes the B+ source 64, connected thereto and coupled to the solenoids of relays K3 and K4. Under these circumstances, the relay K5 is energized through the contact S4 and the output of the receiver 12 disconnected from the automatic pilot 18 and the output of the computer applied thereto. Additionally, when the relay K4 is de-energized by the opening of contact S2, the 28-volt source 68 is coupled through contact S4 to a pair of lights 67 and 69 which, when energized, provide a visual indication of the periods when the computer output is controlling the descent of the aircraft.

Once the serially connected relays K3 and K4 have been energized from source 64 by way of the contacts of relay K2 (as heretofore described) they may be maintained in the energized condition, independently of relay K2, due to the provision of another path leading from another current source (source 70) and constituting a parallel holding circuit for relay K3. This other path may be traced from B+ source 70 through contacts S6a and S6b, or S6a and S6c of a relay K6 via a lead 72, the contact S3 of the relay K3, and the lead 66, that is, the same lead through which relays K3 and K4 were initially energized from source 64. The parallel holding circuit just traced is effective from the moment of first closure of switches S2 and S3 (in the stated order) and remains effective until such time as the aircraft descends to the upper (entering) edge of the flare-out path, at which time relay K6 shifts to the inactive (contacts disengaged) condition. The relay K6 includes two solenoids 74 and 76 which are connected at one end thereof to the anode of tube V1B and returned to ground through a resistor 78 connected to the other end thereof; the resistor 78 and a resistor 80 serially connected thereto and to a 105-volt D.-C. source 82 forms a voltage divider 84. Approximately 64.5 volts is applied to the solenoid 76 across the resistor 78. As will be described more fully subsequently, the magnitude of the current flowing through the solenoids of the relay K6 is dependent upon the conduction of the tube V1B, which in turn controls the position of the contact S6a. It is sufficient at this point merely to point out that when the aircraft is within reasonable limits of the flare-out path contact S6a is open, that is, not engaging either contact S6b or S6c. If the preceding conditions are met, namely, the switch 32 is in Auto position, the aircraft below a certain altitude determined by the current control exerted by the V3B, and the aircraft within reasonable limits of the flare-out path, relays K3 and K4 will be de-energized and the relay K5 will be energized and the output of the receiver 12 will be removed from the input to the amplifier and the automatic pilot. The output of tube V1B at the movable tap 86 of a variable resistor 88 is coupled from contact S5c to the meter 16 and the amplifier 14. Additionally, in the energized position a small positive bias voltage developed at the wiper arm 90 of a potentiometer 92, which together with a resistor 94 connected between a 28-volt D.-C. source 96 and ground form a voltage divider 98, is removed from the cathode of tube V1B. From this point in the flight path, if the aircraft continues on course the flare-out path signals control until touchdown.

The flare-out path signal is generated in the following manner. The electronic altimeter 19 feeds pulses to linear frequency counter 41 to develop a D.-C. voltage indicative of the height of the aircraft above the landing strip. The output of the counter 41 is coupled to the grid of cathode follower V1A. Tube V1A also functions to prevent changes in the impedance of subsequent stages from affecting the magnitude of the height voltage. Substantially —8.5 volts D.-C. is applied to the cathode load resistor via a lead 100. This negative voltage is developed by a rectifier circuit comprised of an A.-C. source 102 and a diode 104, and is the voltage drop occurring across a resistor 106, which together with resistors 108 and 110, and capacitor 112, which is shunted across the resistor 110 for filtering action, forms a voltage divider 114 to ground. The —8.5 volts is also connected to the parallel combination comprised of capacitor 116 and potentiometer 118, which are connected to the counter 41 by a lead 119, and the purpose therefor will be given subsequently. Additionally, a rectifier circuit for generating 105 volts D.-C. for the anodes of many stages and as a bias voltage is provided by a selenium diode 120, a filter circuit 122 including capacitors 124 and 126 and resistor 128, and a voltage regulator stage 130 including a resistor 132 and a regulator tube V5. The regulated voltage appearing at the anode of tube V5 is applied to the stages utilizing same. The voltage appearing between the resistors 128 and 132 is the unregulated B+ supply.

A 105 volt source 134 is connected to the anode of tube V1A. Current appearing at the cathode is coupled via capacitor 136 to the grid of tube V1B and thence to the anode of tube V2B. The cathode of tube V1A is also coupled to the anode of tube V2A through a resistor 137. A resistor 138 is connected between the anodes of tubes 2A and 2B. The cathode load resistors of tubes V1A and V1B are also connected to the —8.5 volt supply developed across the resistor 106. The anode of tube V1B is returned to a 105 volt D.-C. source 140 through a load resistor 142. The cathode of tube V2A is connected to +8.5 volts D.-C. available across the potentiometer 92, while the cathode of tube V2B is returned to ground through a resistor 144.

The diode V2A senses and reflects the rate of descent voltage occurring at its anode. If the height voltage applied to its anode (from the cathode of tube V1A) is equal to or exceeds the cathode voltage (+8.5 volts), the diode conducts and provides a constant voltage indicative of the rate of descent of the aircraft. This constant voltage output is delivered to units 14 and 16 by way of resistor 92, conductor 90, switch contact S5d (now in the right-hand, "automatic," position, rather than "manual" position indicated in FIG. 1) and conductor 38, the return circuit from units 14 and 16 being by way of conductor 36, and switch contact S5b, to ground. Upon initiation of flare-out operation, the anode voltage of tube V2A adds algebraically with the rate of descent voltage, IcR, generated by the time constant comprised of the resistor 138 and the capacitor 136 to generate a resultant voltage indicative of the rate of descent error flare-out voltage. This is the signal integrating operation herein referred to. The normal polarity of the height voltage is positive, while the polarity of the rate of descent voltage, IcR, is negative and proportional to the rate of descent of the aircraft. Thus, when the aircraft is "on" the flare-out path and descending at the proper rate, effectively zero volts are felt at the grid of the tube V1B. For other deviations of the aircraft, a flare-out error signal is felt at the grid of tube V1B.

Relay K6 as aforementioned has two solenoids connected to and energized by the voltage drop occurring across load resistor 142. When the rate of descent error voltage is zero, zero volts are felt at the grid of tube V1B, and the current flowing through the solenoids will remain unchanged. However, if a positive or negative voltage is felt at the grid of V1B, the current through the solenoids will change, and the contact S6a will engage either the contact S6b or S6c, depending on the magnitude and polarity of the signal.

The sensitivity of the solenoids is such that if the output of tube V1B at the cathode resistor thereof is an error signal greater than 30 microamperes, or one dot, is indicated on cross-pointer meter 16, the voltage drop across anode resistor 142 is sufficient to shift the equilibrium of the magnetic field generated by solenoid windings 74 and 76, in one polar direction or the other, and thereby to cause the contact S6a to contact either S6b or S6c with resulting energization of the relays K3 and K4 and de-energization of the relay K5. As aforementioned, when the relay K5 is de-energized the output of the glide-slope receiver 12 controls the operation of the automatic pilot 18 by way of contact S5a, conductors 38 and 36, and contact S5b to ground, the switch S5 being now in the illustrated (left-hand, "manual") position. Therefore, in summation, it is evident that when the aircraft is below 100 feet the tube V3B and the relay K2 operate to render the relay K5 energized and when the rate of descent of the aircraft deviates from a preselected standard, the relay K5 is de-energized and the output of the computer, normally coupled to the automatic pilot below 100 feet, is removed therefrom. Additionally, indicator lights 67 and 69 are extinguished and the pilot is notified of this occurrence so that he may assume control of the final phases of the landing.

An additional function of the tube V1B is its operation as a cathode follower to lower the impedance of the flare-out error signal coupled to the cross-pointer meter 16, the amplifier 14, and the automatic pilot 18 via variable resistor 88. Adjustment of the wiper arm 86 of the potentiometer is a vernier control and enables the pilot to select the gain of the flare-out error signals fed to the automatic pilot 18.

Diode V2B functions to alter the sensitivity of the computer output for positive-error signals, which result if the aircraft rate of descent, as represented by the voltage of the time-constant circuit, capacitor 136 and resistor 138, is too low with respect to the normal flare-out signal or if the aircraft is above the flight path. Tube V2B has its anode connected to the resistor 138 and to the grid of V1B. Its cathode is returned to ground via the resistor 144. Tube V2B conducts whenever its anode voltage exceeds its cathode voltage, that is, whenever the algebraic sum of the error voltage present at the grid of tube V1B is positive with respect to the cathode of the tube V2B. Thus, whenever the aircraft is above the flare-out path a new path is recomputed by the change of the error signal felt at the grid of V1B. However, a sudden ascent of the aircraft near touchdown, caused by a sudden updraft, results in an error signal approximately one-fourth the amplitude of a similar descent below the path due to the operation of the tube V1B. To compensate for this undesirable phenomenon, the new path is computed four times more rapidly for an ascent than for a descent, and thereby, only a low rate of descent is permitted near touchdown.

Diode V4 provides pitch-reference signals to be used with the displacement-type of automatic pilot 18 employed. This circuit provides a pitch-attitude signal dependent upon altitude, but independent of the flare-out error signal, and the circuit is operable only when the switch 32 is in the Auto position. Pitch-reference signals are required with this type of automatic pilot 18 because undesirable glide-slope cross-pointer error must be held to produce an exponential flare-out path if pitch-reference signals are not provided. The relationship between a pitch attitude change, the angle $\theta$, called for by a pitch-reference signal, PR, and the altitude of the aircraft, $h$, in feet, can be expressed by:

$$PR = \theta\left(1 - \frac{h}{30}\right)$$

When $h$ is 30 feet, the pitch-reference signal is zero. Below 30 feet, the aircraft would be commanded to assume a more nose-up attitude as the aircraft approaches the runway.

The cathode of tube V4 is connected at one end thereof to a resistor 146 which is connected to the resistor 106 across which —8.5-volts D.C. exists and to the output of tube V1A at the cathode thereof through a resistor 148 and the switch 32 when it is in the Auto position. The anode is connected to amplifier 14. Since a diode cannot conduct unless its cathode is more negative than its anode, and the cathode potential is the algebraic sum of —8.5 volts and the output of V1A, tube V4 does not conduct until the output of V1A is 8.5 volts or less. With height voltages ranging from zero to 8.5 volts, the output of tube V4 begins at zero volts and increases to a negative value, or the algebraic sum of the height voltage and —8.5 volts. These pitch-reference signals from the tube V4 are combined with a controller signal of the automatic pilot 18, which controls pitch attitude, to form a pitch-command signal during flare-out operation to have the aircraft deviate from the straight-line path to the desired flare-out path. Pitch-reference signals must command at least 2.5 degrees of pitch attitude during flare-out operation to cancel the —2.5-degree slope angle, automatic pilot trim of the aircraft control mechanisms used during glide-slope operation and during flare-out operation when the aircraft is descending at a constant rate. Additionally, pitch-reference signals supplement normal computer signals to obtain the desired path during flare-out operation.

The potentiometer 118 and the capacitor 116 connected in parallel and to the counter 41 at one end thereof and to the resistor 106 at the other end thereof provides a runway-reference control by which the pilot can change the flare-out exponential or asymptote with respect to the landing strip. Approximately —15 volts are available by adjustment of wiper arm 117 which adds algebraically to the positive, linear, height-voltage output of the counter. Thus, the pilot may control the rate of descent of the aircraft until touchdown.

In conclusion, switchover to automatic flare-out operation is subject to three requirements: the switch 32 is in the Auto position; the relay K2 is de-energized; and the flare-out error signal applied to the amplifier 14 and to the automatic pilot 18 at the cathode of the tube V1B is less than 30 microamperes.

Having described an embodiment of the present invention, many equivalent systems will suggest themselves to persons skilled in the prior art without departing from the spirit and scope of the present invention. It is desirable, therefore, not to limit the scope of the present invention to the embodiment used to describe the invention, but rather the scope of the present invention should be defined commensurably with the appended claims.

What is claimed is:

1. In an automatic flare-out landing system for an aircraft utilizing an electronic altimeter for generating height signals indicative of terrain clearance of an aircraft, a glide-slope receiver for generating glide-slope signals for the system, a height meter responsive to said height signals for giving a visual indication of aircraft altitude, an automatic pilot for flight control, and a cross-pointer meter responsive to the input to said automatic pilot for furnishing a visual indication of the position of the aircraft, the combination with said meters, receiver, and automatic pilot, of means for selecting a desired flare-out path for the descent of an aircraft and responsive to the descent of the aircraft to a predetermined altitude position with respect thereto for generating signals indicative of any deviation from said flight path 2. A system as defined in claim 1, wherein said selecting and signal generating means includes means for converting said height signals into a control voltage, and means responsive to a predetermined magnitude of said control voltage for causing delivery of said glide-slope signals to said automatic pilot.

3. A system as defined in claim 2, wherein said selecting and signal generating means includes means connected to and responsive to said control voltage for sensing the position of the aircraft in relation to the preselected flare-out path of descent to generate error signals for any deviation therefrom.

4. A system as defined in claim 1, wherein said selecting and signal generating means includes means connected to and responsive to the height signals for converting said height signals into a control voltage, and controlling means including means responsive to a predetermined magnitude of said control voltage for applying said signals for correcting the path of descent of the aircraft to the automatic pilot, means responsive to said control voltage for generating error signals dependent upon the rate of descent of the aircraft, and means responsive to a predetermined magnitude of said error signals for removing said signals for correcting the path of descent of the aircraft coupled to the automatic pilot.

5. A system as defined in claim 1, wherein said selecting and signal generating means includes means responsive to the height signals for generating a control voltage, means responsive to said control voltage for generating an error signal as a function of said control voltage and a voltage indicative of the rate of descent of the aircraft, switching means coupled to and responsive to a predetermined magnitude of said control voltage for removing glide-slope signals coupled to the automatic pilot and for connecting error signals thereto and responsive to a predetermined magnitude of said error signals for removing said error signals.

6. A system as defined in claim 1, wherein said selecting and signal generating means includes means responsive to the height signals for generating a control voltage, means responsive to the said control voltage for generating an error signal as a function of the rate of descent of the aircraft and as a function of the ascent of the aircraft from a preselected path, means responsive to a predetermined magnitude of said control voltage for switching said error signals to the automatic pilot, said error signal generating means including means responsive to a predetermined magnitude of said error signals for energizing said switching means to remove said error signals to the automatic pilot, and means responsive to said control voltage for generating signals for application to the automatic pilot to control the pitch attitude of the aircraft.

References Cited in the file of this patent

UNITED STATES PATENTS

| 2,674,711 | MacCallum | Apr. 4, 1954 |
| 2,830,291 | Hecht et al. | Apr. 8, 1958 |
| 2,841,345 | Halpert et al. | July 1, 1958 |

FOREIGN PATENTS

| 543,117 | Canada | July 2, 1957 |